June 23, 1970   L. M. SCHWARTZ   3,516,694
COUPLING SLEEVE
Filed March 26, 1968

INVENTOR.
LARRY M. SCHWARTZ.

BY
SETTLE, BATCHELDER & OLTMAN.

ATT'YS.

United States Patent Office 3,516,694
Patented June 23, 1970

3,516,694
COUPLING SLEEVE
Larry M. Schwartz, 1440 Stuyvesant,
Birmingham, Mich. 48010
Filed Mar. 26, 1968, Ser. No. 716,184
Int. Cl. F16l *21/00*
U.S. Cl. 285—236                                              1 Claim

ABSTRACT OF THE DISCLOSURE

A coupling sleeve employed to conduct loose material, such as flour, from the tubular outlet of a vibratory hopper into the inlet of a stationary tubular conduit.

Although not so specifically limited in application, the coupling sleeve of the present invention was designed for use in a flour processing system in which flour is sifted and then conducted from the sifter to a subsequent step in the flour processing operation. Flow of the flour from the sifter to the next processing step is primarily under gravity flow conditions and, to assist in the sifting and gravitational feed of the flour from the sifter, the sifter is vibrated. To conduct the flour to the next processing step, a stationary conduit is employed, and the present invention is concerned with the confining and guiding of the flour from the outlet of the vibratory sifter to the stationary conduit.

The invention is directed to a coupling sleeve having characteristics of flexibility, durability and air-tightness.

Other features and objects of the present invention will become apparent by reference to the following specification and to the drawings.

Figure 1:
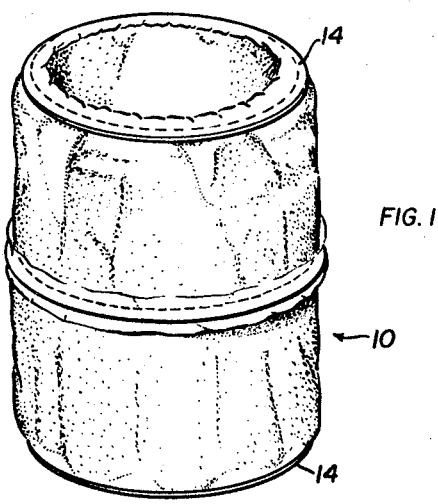
FIG. 1 is a perspective view of a coupling sleeve embodying the present invention.

Referring first to FIG. 1, a coupling sleeve embodying the present invention includes a tubular body designated generally 10 which is resiliently gathered at its opposite ends by a resilient band 12 (FIG. 3) held in place by a seam 14 formed in the fabric of the sleeve body.

Figure 3:
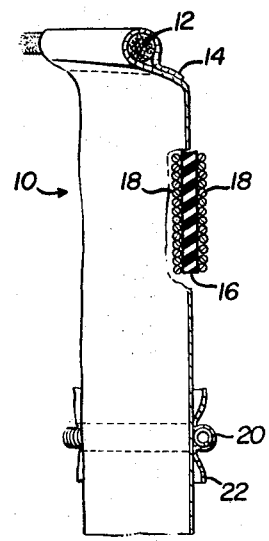
FIG. 3 is a detailed cross-sectional view of a portion of the sleeve, one portion of the cross-sectional view being broken away and enlarged to show details of the sleeve fabric.

As best seen in the enlarged portion of the cross-sectional view of FIG. 3, the fabric from which the sleeve body 10 is constructed is made up of an inner layer of an air impervious resilient material such as a sheet of latex 16. A layer of stretchable woven nylon material 18 is bonded to each side of the latex sheet 16 so that the latex sheet is effectively encased by the woven nylon material.

The sleeve body is constructed from a rectangular piece of the three layer fabric described above and joined into a cylindrical configuration by a conventional overlapping seam, not shown.

The resilient bands 12, which preferably consist of "shock cord," which consists of a number of parallel strands of rubber are formed into an endless annular band having a circumference somewhat less than the normal, unstretched circumference of the tubular sleeve and are then sewn into place at the opposite ends of the tubular sleeve by a conventional seam 14.

A central stiffening band, consisting of a coiled wire spring 20 is formed into an annular ring having a circumference equal to that of the unstretched circumference of the tubular sleeve and is sewn into place to extend the circumference of the sleeve at a central location by means of a fabric tape 22.

Figure 2:
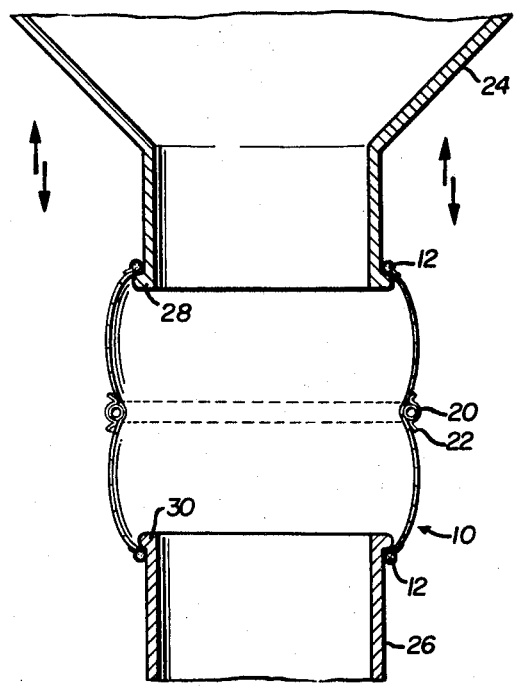
FIG. 2 is a vertical cross-sectional view of the coupling sleeve of FIG. 1 showing the sleeve in place between a hopper outlet and conduit.

Referring now to FIG. 2, in use the coupling sleeve described above is resiliently attached to the lower end of a vibratory hopper 24 and the upper end of a stationary tubular conduit 26 by means of the resilient bands 12. Preferably, the lower end of hopper 24 is formed with a projecting flange 28 and a similar flange 30 is provided on the upper end of conduit 26 to assist in retaining the sleeve against slippage on the ends of the members. The material being conveyed, such as flour, flows under the influence of gravity, assisted by the vibratory movement of the hopper out of the tubular opening defined by the lower end of the hopper and into conduit 26, the coupling sleeve confining the material during its passage between the hopper and conduit. The flexability of the sleeve absorbs the vibratory movement of the hopper relative to the stationary conduit. Normally, flow of the material is under the influence of gravity, although occasionally air pressure may be applied above the material in the hopper, as in the case of forcing a residue of material from the hopper into the conduit. The annular band 20 resiliently resists collapsing of the sleeve which may tend to occur during normal usage by virtue of intermittent flow of material through the sleeve. The multi-layer fabric formed of stretchable nylon outer layers and a resilient latex sheet accommodates limited stretching and flexing of the fabric during normal usage, while the woven nylon outer layer resists abrasion due to rubbing action between the sleeve, hopper and conduit and the flow of material through the sleeve.

While one embodiment of the invention has been described in detail, it will be apparent to those skilled in the art that the disclosed embodiment is capable of being modified. Therefore, the foregoing description is to be considered exemplary rather than limiting, and the true scope of the invention is that defined in the following claims.

I claim:

1. A coupling sleeve for coupling a tubular vibratory member to a stationary tubular member to conduct and confine the flow of loose material from one of said members into the other comprising a tubular sleeve consisting of a central layer of resilient air-tight material sandwiched between and bonded to outer layers of a stretchable wear resistant fabric, annular resilient bands at each end of the sleeve contracting the ends of said tubular sleeve for resiliently retaining said sleeve on said tubular members, each resilient band arranged so that the respective sleeve end wraps around and retains the band in place on the sleeve end, and an endless spring secured to and extending around said sleeve intermediate the ends thereof for resiliently maintaining the central portion of said sleeve in a circular configuration, a tape member encasing said endless spring and securely fastened to the exterior of the medial portion of the sleeve, the circumference of said resilient bands being somewhat less than sleeve and the circumference of said endless spring being equal to that of the unstretched circumference of the tubular sleeve, and wherein said bands assist in retaining the sleeve against slippage from said tubular vibratory member and wherein said endless spring resiliently resists collapsing of the sleeve which may tend to occur during normal usage by virtue of intermittent flow of material through the sleeve.

References Cited

UNITED STATES PATENTS

| | | | |
|---|---|---|---|
| 701,936 | 6/1902 | Roberts | 285—235 X |
| 927,635 | 7/1909 | Calvert | 285—236 X |
| 2,451,791 | 10/1948 | Weaver | 285—235 X |
| 3,043,612 | 7/1962 | Parlik et al. | 285—236 X |
| 3,087,745 | 4/1963 | Rumbell | 285—236 X |
| 3,114,568 | 12/1963 | Buono | 285—235 |

REINALDO P. MACHADO, Primary Examiner

W. L. SHEDD, Assistant Examiner